United States Patent
Jankovic et al.

[11] Patent Number: 6,164,400
[45] Date of Patent: Dec. 26, 2000

[54] HYBRID POWERTRAIN CONTROLLER

[75] Inventors: Miroslava Jankovic, Birmingham; Barry Kay Powell, Belleville, both of Mich.

[73] Assignee: Ford Global Technologies, Inc., Dearborn, Mich.

[21] Appl. No.: 09/095,374

[22] Filed: Jun. 10, 1998

[51] Int. Cl.[7] .................................................. B60K 6/04
[52] U.S. Cl. .................... 180/65.2; 180/65.6; 180/65.8
[58] Field of Search .................... 180/65.1, 65.2, 180/65.3, 65.4, 65.5, 65.6, 65.7, 65.8

[56] References Cited

U.S. PATENT DOCUMENTS

| | | |
|---|---|---|
| 3,791,473 | 2/1974 | Rosen . |
| 3,804,191 | 4/1974 | Golan et al. . |
| 4,335,429 | 6/1982 | Kawakatsu ............................... 701/102 |
| 4,407,132 | 10/1983 | Kawakatsu et al. . |
| 5,305,662 | 4/1994 | Togai et al. . |
| 5,327,992 | 7/1994 | Boll . |
| 5,343,970 | 9/1994 | Severinsky . |
| 5,389,050 | 2/1995 | Sakai et al. . |
| 5,390,117 | 2/1995 | Graf et al. . |
| 5,487,007 | 1/1996 | Suzuki et al. . |
| 5,577,973 | 11/1996 | Schmidt ....................................... 475/5 |
| 5,586,613 | 12/1996 | Ehsani . |
| 5,625,558 | 4/1997 | Togai et al. . |
| 5,656,921 | 8/1997 | Farrall . |
| 5,789,881 | 8/1998 | Egami et al. ............................. 318/139 |
| 5,789,882 | 8/1998 | Ibaraki et al. ........................... 318/148 |
| 5,929,608 | 7/1999 | Ibaraki et al. ............................. 322/16 |
| 5,979,257 | 11/1999 | Lawrie ....................................... 74/335 |

FOREIGN PATENT DOCUMENTS

| | | |
|---|---|---|
| 4324010 A1 | 1/1995 | Germany . |

*Primary Examiner*—Brian L. Johnson
*Assistant Examiner*—Bridget Avery
*Attorney, Agent, or Firm*—Mark S. Sparschu

[57] ABSTRACT

A hybrid powertrain for a vehicle comprising a diesel engine and an electric motor in a parallel arrangement with a multiple ratio transmission located on the torque output side of the diesel engine, final drive gearing connecting drivably the output shaft of transmission to traction wheels of the vehicle, and an electric motor drivably coupled to the final drive gearing. A powertrain controller schedules fuel delivered to the diesel engine and effects a split of the total power available, a portion of the power being delivered by the diesel and the balance of the power being delivered by the motor. A shifting schedule for the multiple ratio transmission makes it possible for establishing a proportional relationship between accelerator pedal movement and torque desired at the wheels. The control strategy for the powertrain maintains drivability of the vehicle that resembles drivability of a conventional spark ignition vehicle engine powertrain while achieving improved fuel efficiency and low exhaust gas emissions.

3 Claims, 7 Drawing Sheets

HYBRID POWERTRAIN CONTROLLER

STATEMENT OF GOVERNMENT INTEREST

This invention was made with United States Government support under Prime Contract No. DE-AC-36-83CH10093, Subcontract No. ZCB-4-13032-02, awarded by the Department of Energy. The Government has certain rights in this invention.

TECHNICAL FIELD

The invention relates to the control of a diesel engine and an electric motor in a parallel hybrid, post-transmission powertrain configuration for an automotive vehicle.

BACKGROUND OF THE INVENTION

Due to increased interest in reducing the fuel consumption and exhaust pollution, while satisfying the customer demands for better performance, the automotive industry has become more interested in research and development of hybrid electric vehicles. Powertrains for such vehicles have advantages over conventional internal combustion engine propelled powertrains including reduced fuel consumption and exhaust emissions, while providing the same range of driving (not limited by batteries as in the case of pure electric vehicles).

The concept of the hybrid powertrain is not novel. The conceptual background is documented in several patents. Some of the recent ones are U.S. Pat. No. 5,656,921 granted to Farrall in 1997 and U.S. Pat. No. 5,343,970 granted to A. J. Severinsky in 1994.

In his U.S. Pat. No. 5,343,970, Sep. 6, 1994 Severinsky gives an extensive overview of different hybrid configurations. He provides specific reasons why the configuration he proposes provides advantages in comparison to all other hybrid vehicle configurations. He considers a parallel hybrid vehicle without a multiple-ratio transmission. Instead, a controllable torque transfer unit of fixed gear ratio is employed. Both an SI engine and an electric motor are on the same side of the torque transfer unit.

Severinsky describes the modes of operation of the hybrid vehicle: i.e., (i) operating the electric motor only at low speeds or in traffic, using the power stored in batteries; (ii) operating during heavy power demands when both engine and the motor provide the torque to the wheels; and (iii) operating steady state when the internal combustion engine alone drives the vehicle.

Farrall (U.S. Pat. No. 5,656,921; Aug. 12, 1997) also considers a parallel hybrid with both power sources on the same side of the transmission. It employs fuzzy logic rules to adjust the entries in the tables determining the power splitting between the SI engine and the electric motor. The performance measure used to adjust the entries is given by the weighted ratio between the battery current and fuel flow rate.

These prior art patents assume (implicitly) that the powertrain has a spark ignition engine which operates at fixed air-to-fuel ratio. The issues related to control of SI engines relate to controlling the air flow past the throttle. In most of the operating range for a given throttle opening a constant fuel flow is injected into the engine corresponding to the constant flow of air (in g/s) past the throttle. On the other hand, with a diesel engine cycle fuel can be directly controlled, so the issues related to controlling a diesel engine are unrelated to the issues of air management in spark ignited engines.

The '970 and '921 patents do not discuss consistent pedal feel in parallel hybrid vehicles nor do they describe a means for achieving it. The patents describe an SI (spark ignited) engine, not a direct injection diesel engine. They assume a throttle as an air control device. Finally, the '970 and '921 patents consider a different configuration of a parallel hybrid without transmission shifting considerations.

SUMMARY OF THE INVENTION

The invention comprises a particular configuration of a hybrid automotive vehicle. It consists of a diesel engine supplying torque to the wheels through a multiple-ratio automatic transmission and an electric motor, located on the wheels side of the transmission. The configuration is called "parallel" because either power source could propel the vehicle. It is called "post transmission" because the IC engine is located at the input side while the electric motor is located at the output side of the transmission. Given this particular configuration, an objective is to achieve a consistent response to pedal input in all modes of hybrid vehicle operation.

To accomplish the foregoing objective, the invention features a particular shape of the curves in the fuel injection maps of the direct injection diesel engine. This shape, in general, is different from the curves for conventional direct injection diesels. In addition, a consistent interpretation of a pedal position signal with respect to wheel torque and power is made regardless of whether the traction comes from the diesel engine, the electric motor or both. Finally, a transmission shift schedule, which in a post-transmission hybrid affects only the diesel engine, was modified in accordance with the power split feature of the invention.

The electric motor preferably is used only for low power levels, while the diesel engine is used above a certain power threshold. The electric motor is also used for power boost during acceleration and hill climbing maneuvers.

The invention makes it possible to provide consistent feel of the accelerator pedal regardless of the power source used (diesel engine, electric motor or both). This drivability issue is related but different from the issue of smooth transition between the two power sources. To accomplish a consistent pedal feel, a particular shape of the curves in the fuel injection maps of the direct injection diesel engine is used. This was inspired by the observation that in spark ignited (SI) engines, assuming constant efficiency throughout the engine speed operating range, constant pedal demand corresponds to the constant power delivered from the engine. The invention provides for fueling the diesel in such a way that similar drivability is achieved.

The powertrain controller schedules fuel to the diesel engine. The pedal control for the diesel engine is calibrated so that pedal position is proportional to the power at the wheels. The power at the wheels is approximately equal to the sum of the power delivered from each of the power sources. The desired power at the wheels is the sum of the desired engine power and the desired electric motor power.

Since the engine speed can be measured, the desired engine torque is equal to the engine power divided by engine speed. Likewise, the desired motor torque is equal to the power desired from the electric motor divided by the electric motor speed. The electric motor speed can be determined since the vehicle speed is known and since the final drive gear ratio is a fixed ratio. The speed of the electric motor thus can be computed readily.

This strategy requires at least two maps that indicate the functional relationships between the variables that are required by the strategy. The first map determines the relationship between foot pedal movement and the power at the wheels. The second map determines the relationship between the desired engine power and fuel scheduling where constant pedal is equivalent to constant power requested from the engine. This is the so-called fuel scheduling map.

The information that is recorded in the functional relationship maps includes a curve representing the maximum available torque from the engine. If power can be achieved by the controller only by downshifting the transmission, the output driver circuits for the controller will effect a downshift in response to advancement of the accelerator pedal position. The requested power corresponding to the pedal position is obtained by downshifting until the operating point falls inside the maximum torque envelope. If the operating point still is outside the maximum torque envelope of the diesel engine following a first downshift, the controller will effect a second downshift.

If maximum torque cannot be achieved by the engine alone and the operating point falls outside the maximum torque, the electric motor will add power to the final drive gearing following the downshift.

The strategy for the invention will satisfy all driver demands based on only one input from the driver; i.e., the pedal position. The performance maps that are precalibrated and stored in memory will make it possible for the engine to operate in a region of the performance curve where the engine torque and the engine speed will fall in a minimum specific fuel consumption zone.

PARTICULAR DESCRIPTION OF THE INVENTION

Figure 1:
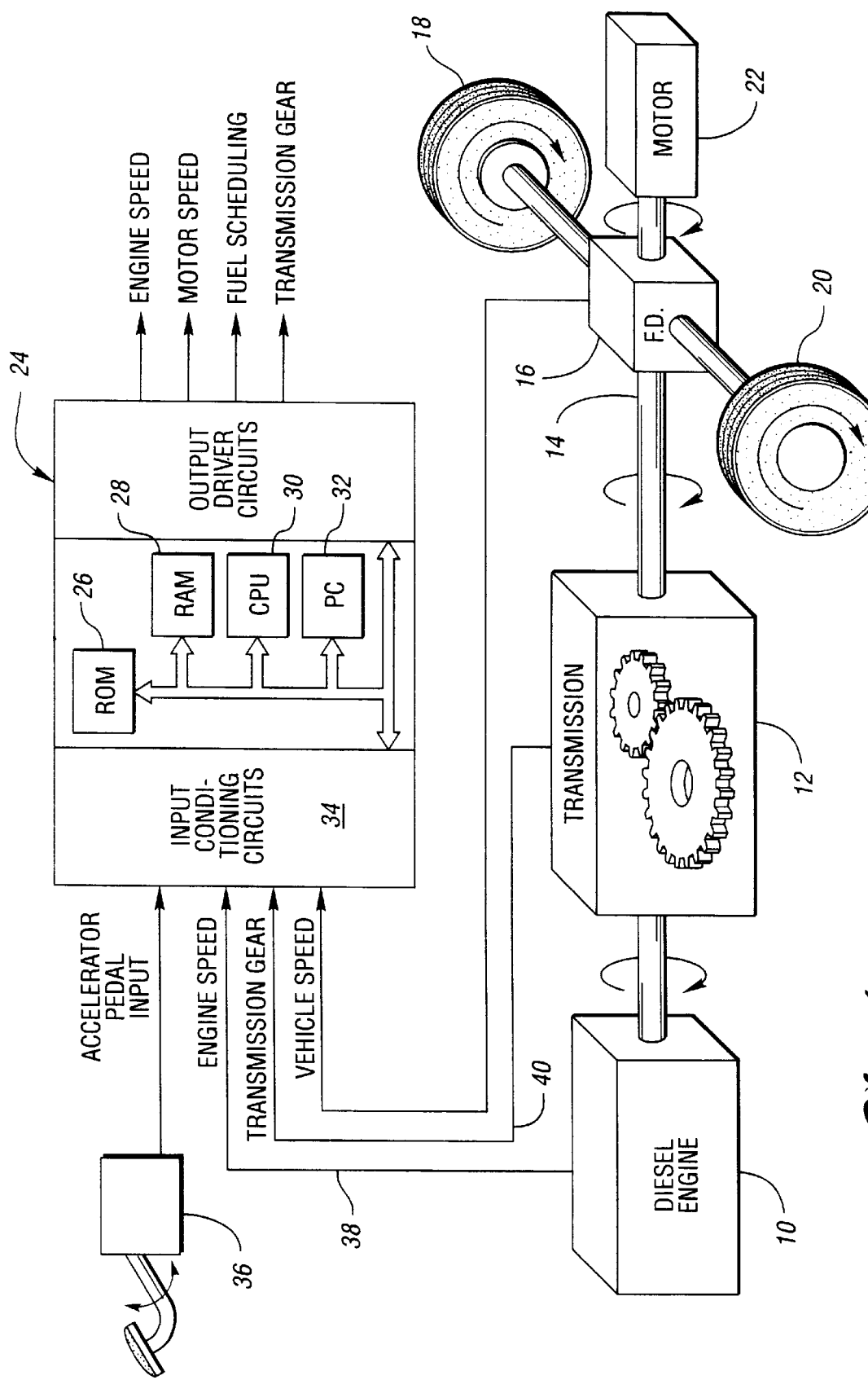
FIG. 1 is a schematic representation of the overall driveline and driveline controller.

In FIG. 1, numeral 10 designates a diesel engine for use in a vehicle driveline. A multiple ratio transmission is schematically shown at 12. The input gearing for the transmission 12 is connected to the crankshaft for the diesel engine 10.

The output shaft 14 for the transmission 12 is connected drivably to final drive gearing 16, which delivers torque from the shaft 14 to each of two traction wheels 18 and 20.

An electric motor, preferably a high capacity induction motor, is shown at 22. It has a motor armature that is connected drivably to the final drive gearing 16. An electronic controller 24 controls the overall driveline. It comprises a ROM memory 26, a RAM memory 28, a central processor unit 30, and a program counter 32. An input conditioning circuit portion 34 of the controller 24 receives input information from an accelerator pedal transducer 36. This accelerator pedal input in an indication of diesel engine throttle position.

The diesel engine 10 has a speed sensor for delivering a speed signal at 38 to the input conditioning circuits 34. Information concerning the transmission gear ratio is transmitted through signal flow path 40 to the input conditioning circuits.

The information at the input side of the controller is received by the registers in RAM. The central processor unit, under the direction of the program counter 32, selectively addresses the registers in RAM. The information fetched by the CPU is used in computations involving the performance maps that are stored in ROM. The result of those computations is distributed to the output driver circuits in the form of engine speed information, motor speed information, fuel scheduling, and transmission gear ratio.

Figure 2:
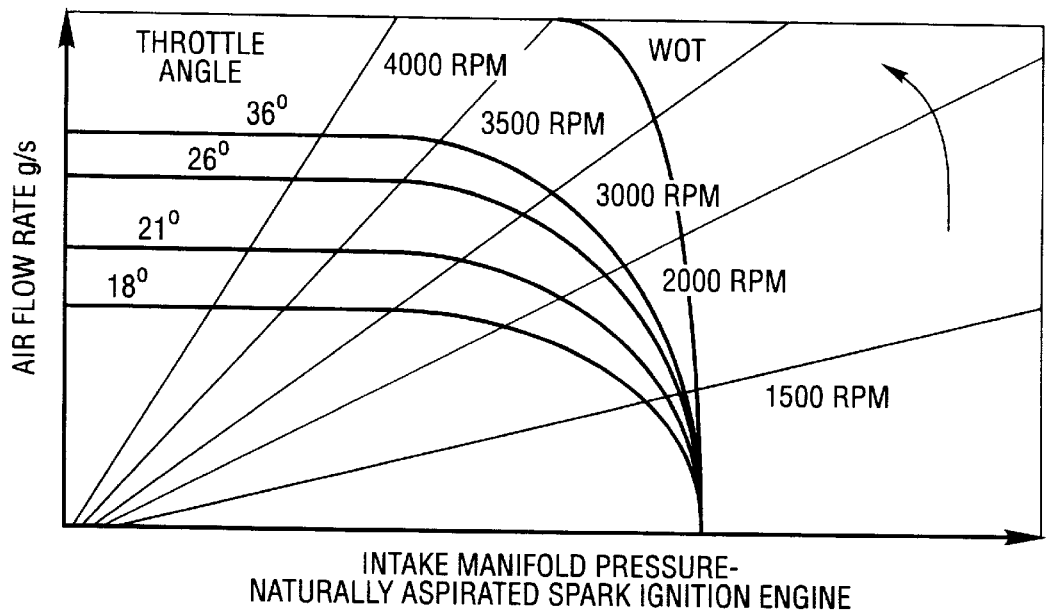
FIG. 2 is a performance chart showing the relationship between manifold pressure, air flow rate, throttle position, engine speed, and power for a naturally aspirated SI engine.

FIG. 2 shows a performance chart for a conventional spark ignition engine. This chart is described for the purpose of explaining a contrast between the diesel engine used with the present invention and a conventional spark ignition engine of the kind used in hybrid vehicle drivelines of the kind referred to in the background discussion.

FIG. 2 shows the variation in air flow rate past a throttle as a function of throttle angle, engine speed, and intake manifold pressure. Since the accelerator pedal is mechanically connected to the throttle for a naturally aspirated spark ignition engine, it is explained in the following text that air flow rate represents the power demanded by the operator.

The mass air flow rate for pressure ratios across the throttle at high manifold pressures is represented by the following equation:

$$\dot{m}_{th} = \frac{C_p A_{th} P_o}{\sqrt{RT_0}} \left(\frac{p_t}{p_0}\right)^{\frac{1}{\gamma}} \left\{ \frac{2\gamma}{\gamma-1} \left[ 1 - \left(\frac{p_1}{p_o}\right)^{\frac{(\gamma-1)}{\gamma}} \right] \right\}^{\frac{1}{2}} \quad (1)$$

For pressure ratios less than a critical value, mass flow rate is represented by:

$$\dot{m}_{th} = \frac{C_p A_{th} P_o}{\sqrt{RT_0}} \gamma^{\frac{1}{2}} \left(\frac{2}{\gamma+1}\right)^{\frac{(\gamma+1)}{2(\gamma-1)}} \quad (2)$$

where:
$C_p$ is the constant;
$A_{th}$ is the area of the throttle throat;
$p_1$ is the pressure downstream of the throttle;

R is a constant;
$T_0$ is the temperature downstream of the throttle;
$p_0$ is ambient pressure; and
$\gamma$ is the specific heat.

It is seen from Equation 2 that the air flow rate at a given constant throttle is independent of manifold pressure and engine speed. Since a spark ignition engine operates at a fixed air/fuel ratio that is stoichiometric, the constant throttle position corresponds to the constant fuel injected which is proportional to the energy generated by the engine. The rate of fuel burned (kilograms per hour) therefore is proportional to the power generated by the engine. Therefore, if it is assumed that the engine operates at a constant efficiency (i.e., thermal efficiency plus friction and pumping efficiency) and the manifold pressure is less than the critical value, constant accelerator pedal position corresponds to constant engine power.

It also is apparent from FIG. 2 that at low to moderate engine speeds, significant increases in throttle opening resulting from significant depressions in the pedal provide only minor changes in air flow and engine torque, assuming that stoichiometric air/fuel ratio is maintained. At 1500 rpm, for example, an increase from a 36 degree throttle opening to wide open throttle provides an increase in air flow of less than 6%. In a vehicle having an automatic transmission, this pedal low sensitivity zone could be used as a natural signal to command a downshift and accommodate the driver's request for an increase in engine power.

Figure 3:
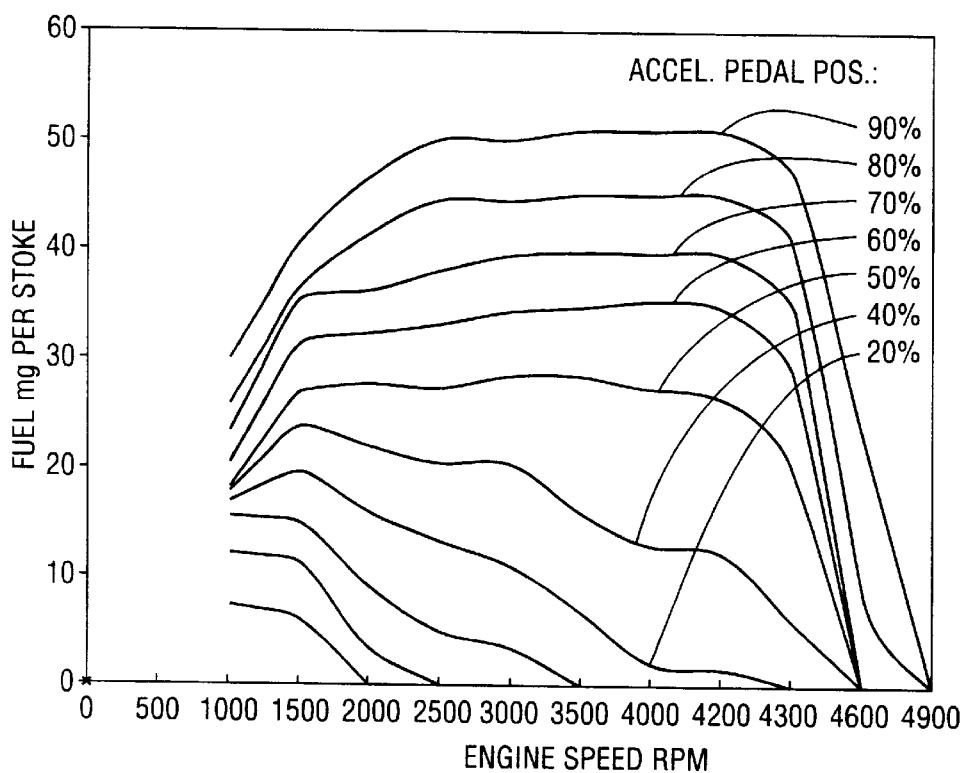
FIG. 3 is a performance chart showing the relationship between engine speed and fuel delivery per stroke of the fuel injector for various accelerator pedal positions for a diesel engine.

Referring next to FIG. 3, the characteristic of a typical diesel engine is shown. In the case of a diesel engine, a demand for power is made by changing the fuel rate directly. Thus, for a diesel-powered vehicle, the relationship between accelerator pedal position and fuel is not restricted by stoichiometric control as in the case of the spark ignition engine. The fuel rate is electronically controlled. In the example of FIG. 3, the fuel scheduling map shows the relationship between the accelerator pedal position in percentage and the fuel requested in milligrams per stroke as a function of speed.

The plot of FIG. 3 is an example of the typical fuel scheduling characteristic for a diesel engine with a manual transmission. For a high percentage of pedal depression and for speeds in the range of approximately 2500 rpm to 4200 rpm, a constant pedal position corresponds to a constant value of fuel delivered in milligrams per stroke of injected fuel. The relationship between the amount of fuel in milligrams per stroke and torque is expressed as follows:

$$\underbrace{\left[\frac{mg}{stroke}\right]}_{[Fuel\_rate]} * \underbrace{\left[\frac{stroke}{rev}\right]}_{[const]} * \underbrace{\left[\frac{rev}{sec}\right]}_{[N_{engine}]} * \underbrace{\left[\frac{J}{mg}\right]}_{[heat\_value]} = \underbrace{\left[\frac{J}{sec}\right]}_{[Power]} \quad (3)$$

When Equation 3 is solved for milligrams per stroke, the fuel rate is expressed as follows:

$$\left[\frac{mg}{stroke}\right] \approx \frac{\left[\frac{J}{sec}\right]}{\left[\frac{rev}{sec}\right]} = \frac{[Power]}{[N_{engine}]} \approx [Torque]. \quad (4)$$

Fuel injected at a constant rate in milligrams per stroke corresponds to a constant torque output. If the fuel rate in milligrams per stroke is represented by X, the corresponding kilograms per hour expressed by the value Y can be obtained using the following conversion:

$$X[mg/stroke] = Y = 1.20*10^{-4}*N*X[kg/hr] \quad (5)$$

If the fuel is injected at a constant rate in kilograms per hour, the corresponding value in milligrams per stroke decreases with increasing engine speed and is, therefore, proportional to engine torque.

As seen in FIG. 3, for low pedal positions, a constant pedal position corresponds to decreasing lines of fuel measured in milligrams per stroke which, in turn, corresponds to constant power developed by the engine.

FIG. 3 also demonstrates the problem involved in using the fuel schedule of FIG. 3 with an automatic transmission. For a conventional vehicle with a manual transmission, the driver has two primary inputs to regulate driveline torque. Those inputs are the pedal position and the transmission gear. In the instance when pressing on the accelerator pedal does not yield satisfactory response, the driver can downshift to increase the power at the wheels. The fuel schedule shown in FIG. 3 does not have a pedal low sensitivity zone that can be used as a signal for downshifting the vehicle with an automatic transmission. In this respect, the diesel engine performance represented by FIG. 3 differs from the spark ignition engine performance indicated in FIG. 2.

In a vehicle with an automatic transmission, a driver request for increased torque is interpreted from pedal depression only. A fully depressed pedal is an indication that the driver requests maximum power from the engine, but the fueling alone is not capable of provide that increase in power. (At 1500 rpm or 2000 rpm, maximum power from the engine cannot be achieved by merely fueling the engine). Therefore, at low engine rpm, any automatic transmission will interpret this driver demand as a command to downshift. As a result, the top left corner of the performance map of FIG. 3 is never used.

The improved control system of the invention, in which the hybrid electric vehicle is powered by both an electric motor and a diesel engine with an automatic transmission, uses the strategy of splitting the power available from each of these two power sources. The electric motor may be used for low power levels and the diesel engine may be used above a certain power threshold. The strategy of the invention effects this power splitting concept by determining how to schedule the fuel to accomplish power splitting and how to decide between downshifting and using the electric motor to get more engine torque.

If the pedal is calibrated so that the pedal position is proportional to the power at the wheels, these two tasks are simplified. It requires merely the following basic relationship between pedal position and power at the wheels:

$$\text{Pedal} = \text{constant} * P_{desired}^{wheels}, \quad (6)$$

where $P_{desired}^{wheels}$ is the power desired at the wheels and "Pedal" is the foot pedal position in % of pedal depression.

Power at the wheels is approximately equal to the sum of the power delivered from each power source. Based on the aforementioned strategy, therefore, the desired power is split into two parts, the magnitude of each being proportional to the power desired from each power source:

$$P_{desired}^{wheels} = P_{desired}^{engine} + P_{desired}^{em}. \quad (7)$$

The amount of torque available from each power source is determined from the foregoing computation of power at the wheels. It is represented by the equation:

$$T_{desired}^{engine} = P_{desired}^{engine}/N_{engine}. \quad (8)$$

Furthermore, the corresponding equation for the electric motor is represented as follows:

$$T_{desired}^{em} = P_{desired}^{em}/N_{em}. \quad (9)$$

In the foregoing equations, $T_{desired}^{em}$, $P_{desired}^{em}$, $P_{desired}^{engine}$ and $T_{desired}^{engine}$ are desired torque and power from the electric motor and from the diesel engine.

In view of the foregoing requirements, the following maps are determined and are stored in ROM where the information in each map can be accessed.

Figure 7:
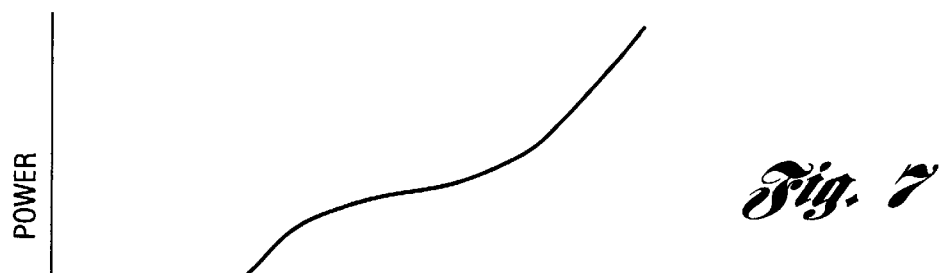
FIG. 7 is a plot of a first performance map that is stored in ROM portions of the controller illustrated schematically in FIG. 1, which demonstrates the relationship between desired overall power delivered to the traction wheels and accelerator pedal position.

The first map is shown in FIG. 7. This map determines the relationship between foot pedal movement and the power at the wheels, which is the basic control variable over which the operator has control. This map is calibratable (i.e., it is possible to achieve the best feel).

Figure 8:
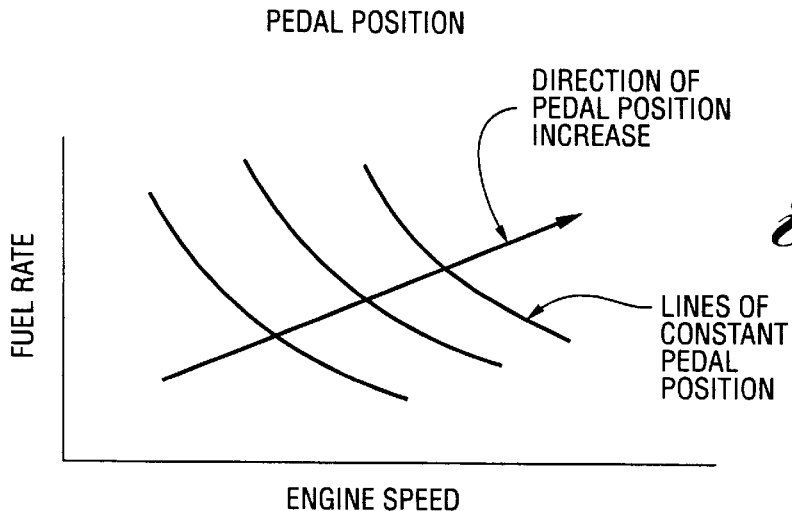
FIG. 8 is a plot of a second performance map for the diesel engine illustrating the relationship between pedal position, fuel rate, and engine speed.

The second map is shown in FIG. 8. This is a map that determines the relationship between $P_{desired}^{engine}$ and the fuel rate where a constant pedal represents a constant power request from the diesel engine. This is the so-called fuel scheduling map.

Figure 4:
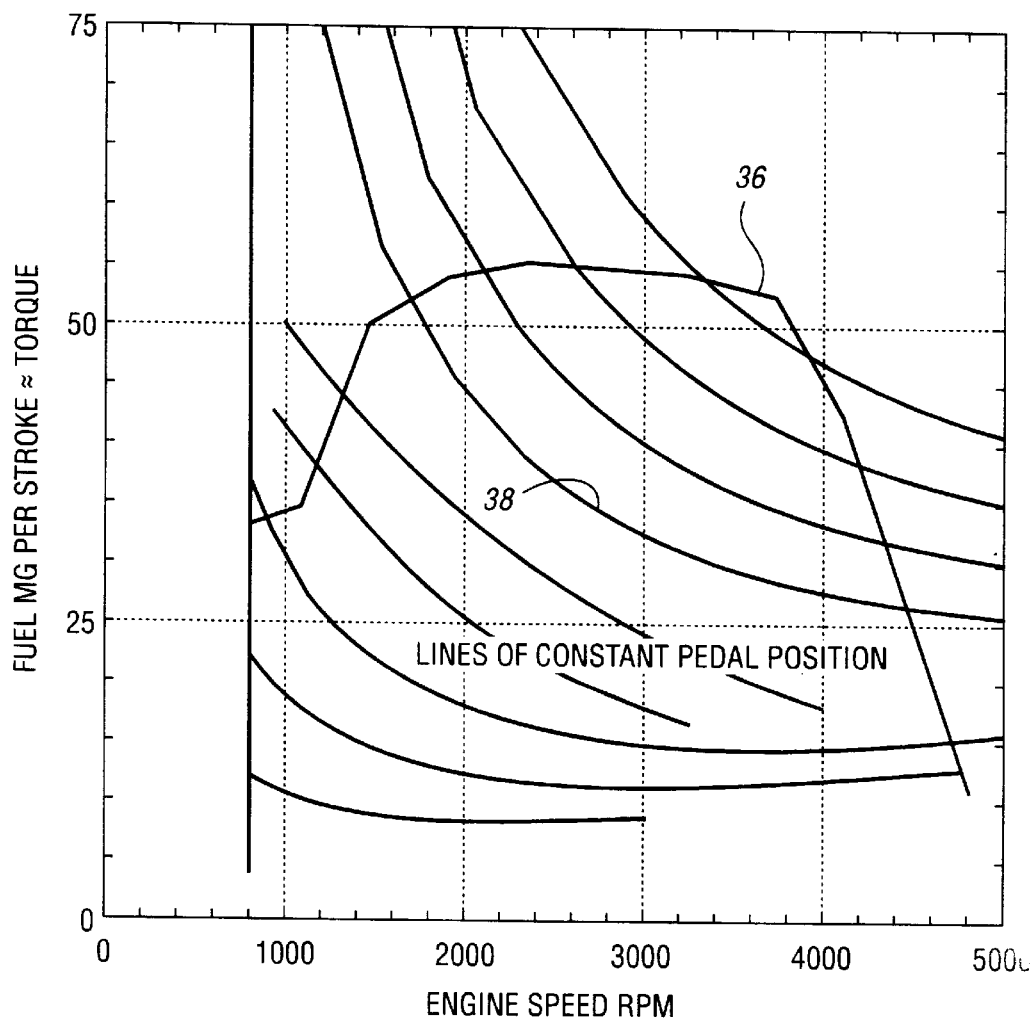
FIG. 4 is a fuel scheduling chart for a diesel engine in a hybrid vehicle driveline, which includes an electric motor.
Figure 4A:
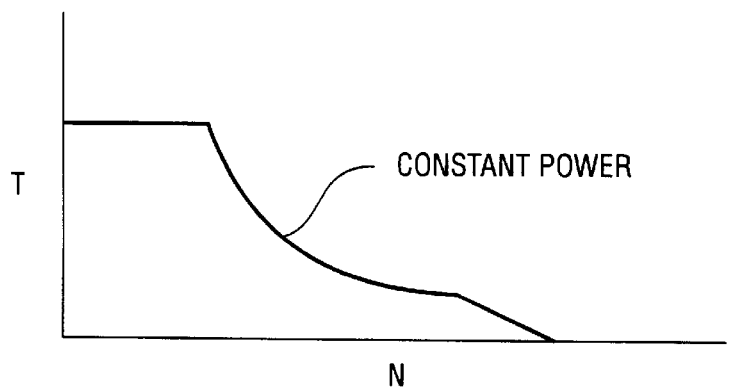
FIG. 4a is a plot of torque versus speed for an electric induction motor.
Figure 5:
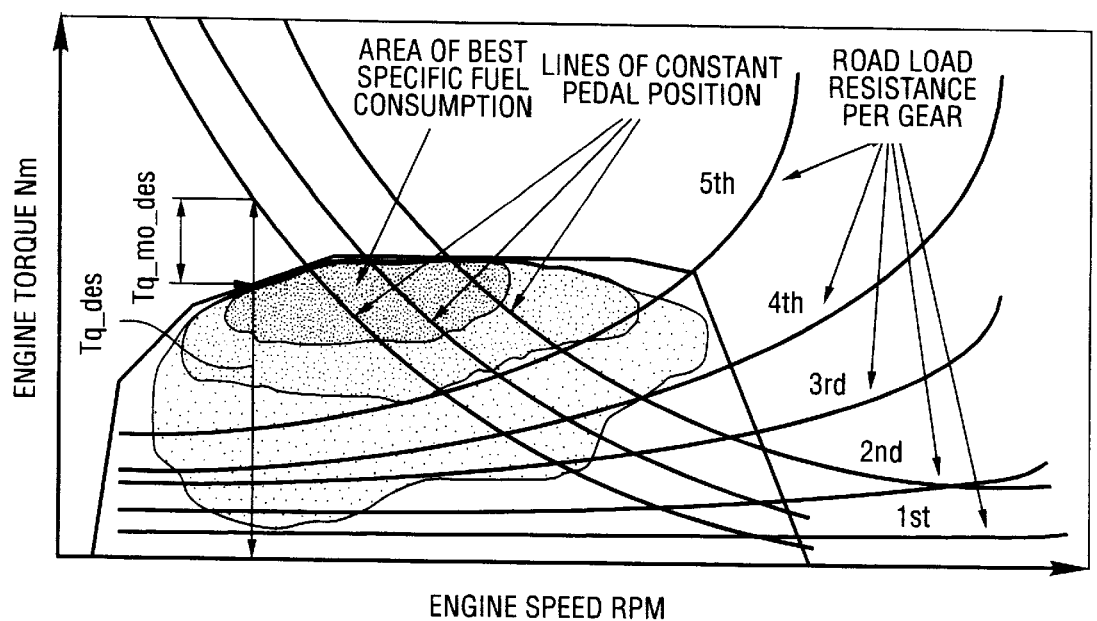
FIG. 5 is a performance chart showing zone of best fuel efficiency and the fuel scheduling characteristics for a diesel engine in a hybrid vehicle driveline that includes an electric motor.

FIG. 4 shows a curve representing maximum torque available from the engine superimposed on the fuel scheduling map. The maximum torque available from the engine is represented by curve 36, whereas the lines of constant pedal position are shown by the family of lines 38.

Figure 9:
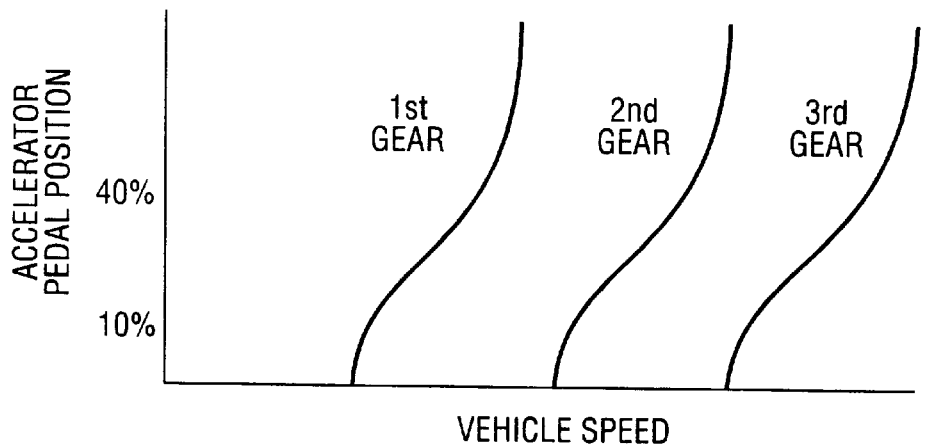
FIG. 9 is an upshift schedule for the automatic transmission, which demonstrates the shift points depending on pedal position and vehicle speed.

During upshifting, it is possible to keep a standard shift schedule, represented, for example, by FIG. 9. The schedule of FIG. 9 is a typical shift schedule for an automatic transmission with a spark ignition engine. This shift schedule is readily available and is generally accepted as an optimum shift schedule for a conventional automatic transmission vehicle without hybridization.

Figure 10:
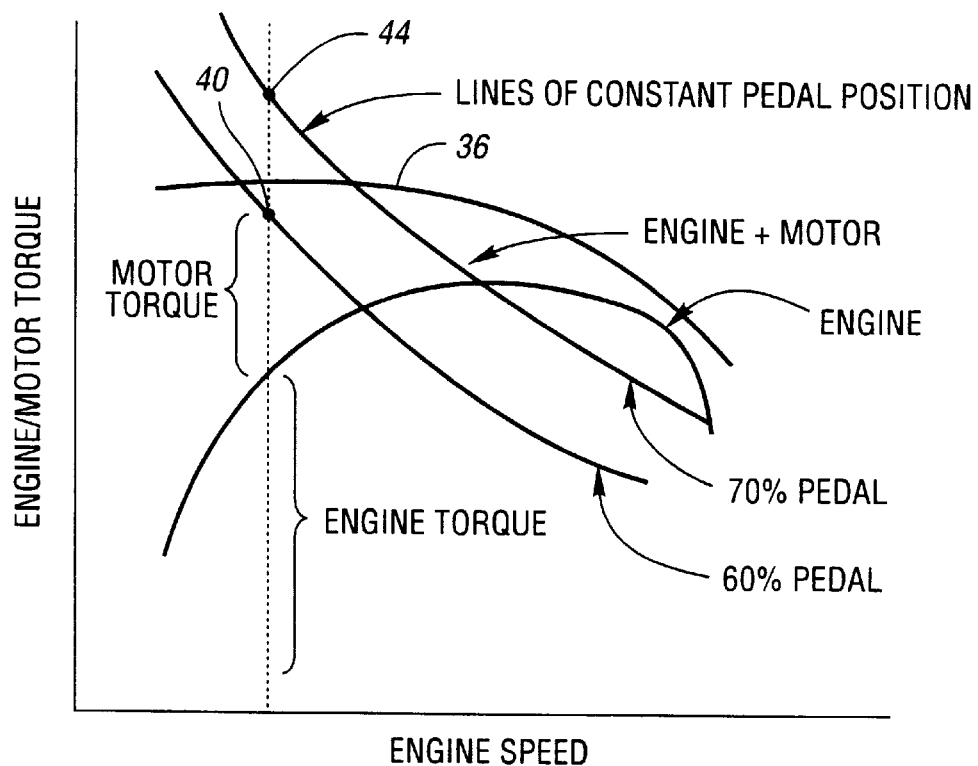
FIG. 10 is a plot of the overall torque made available to the driveline by the engine and electric motor and the engine speed using the control strategy of FIG. 6.

In the case of downshifts, care must be taken to avoid moving the operating point 40 outside the maximum torque envelope shown in FIG. 4 at 36. For example, assume the engine is operating at 1200 rpm and 20% pedal opening. When the driver requests more power, assume the pedal is moved to an advanced setting (e.g. 70%). (Refer to FIG. 10.) It is the objective of the scheduling system to provide the requested power by downshifting, thereby moving on the 70% power curve until the operating point falls inside the maximum torque envelope. If this is not possible, the hybrid vehicle controller will add power from the electric motor.

The upper left hand corner of the fueling schedule is available with the strategy of the invention. A hybrid vehicle employing the improved strategy of the invention thus provides the operator with a sensation that is similar to that of a spark ignition engine powered vehicle.

To illustrate the execution of the algorithm, the following example is set forth:

Denote by $N_{max}^{downshift}$ the maximal speed above which one does not want the engine to operate (e.g. $N_{max}$= 4400 rpm), initial pedal position at some time t=$t_0$, Pedal$^0$ (e.g. Pedal$^0$=30%) and the corresponding power $P_0$=30% $P_{max}$ and engine speed N (e.g. $N_0$=1500 rpm). Denote initial gear ratio $g^0$, e.g. in the fourth gear: $g^0$=$g_4$. If at time t=$t_1$, pedal position changes, say Pedal$^1$=60%, this is equivalent to commanding to go to a different power curve $P_1$=60% $P_{max}$ on the fueling scheduling map (FIG. 3). The new operating point could be inside or outside the envelope of the maximum engine torque. Calculate the engine torque: $T_1^{eng}$=$P_1/N_1$ and consider three cases:

Case 1: $T_1^{eng}$<$T_{max}^{engine}$ ($N_1$)—New operating point is inside the envelope. Stay in the same gear, therefore, and calculate the fuel from the fuel scheduling map. (Note the engine is operating in the area of high fuel efficiency).

Case 2: $T_1^{eng}$>$T_{max}^{engine}$ ($N_1$)—New operating point falls outside the envelope of max. engine torque. Consider, therefore, downshifting (to increase the torque at the wheels). Calculate the engine torque $T_2^{eng}$ and the engine speed $N_2$ after prospective downshift to the third gear (gear ratio $g_3$): $N_2$=$N_1$ $g_4/g_3$ and $T_2^{eng}$=$P_1/N_2$. Consider, then, the three following cases:

Case 2.1: $N_2$>$N_{max}$—New operating point falls beyond the point where one would command the downshift. Therefore: stay in same gear. Command the engine to $T_2^{engine}$=$T_{max}^{engine}$ ($N_1$), and make up the difference with the electric motor by commanding:

$$T_0^{em} = \frac{P_1 - N_1 * T_2^{eng}}{N_1} * \frac{g_4}{g_{fd}}$$

Case 2.2: $T_2^{eng}$<$T_{max}^{engine}$ ($N_2$), $N_2$<$N_{max}$—New operating point is inside the envelope after a single downshift. Command the downshift, set gear ratio to $g_3$, and command the fuel from the fueling schedule map.

Case 2.3: $T_2^{eng}$<$T_{max}^{engine}$ ($N_2$), $N_2$<$N_{max}$—New operating point falls outside the envelope of max. engine torque. Consider, therefore, double downshift (e.g., from fourth to second gear). Calculate the engine torque $T_3^{eng}$ to the second gear (gear ratio $g_2$): $N_3$=$N_1$ $g_4/g_2$ and $T_3^{eng}$=$P_1/N_3$. Consider, then, the following three cases:

Case 3.1 $N_3$>$N_{max}$—New operating point falls beyond the point where one would command the downshift. Command a single downshift (gear ratio is $g_3$). Command the engine to $T_3^{eng}$=$T_{max}^{engine}$ ($N_2$), and make up the difference with electric motor by commanding:

$$T_1^{em} = \frac{P_1 - N_2 * T_2^{eng}}{N_2} * \frac{g_3}{g_{fd}}$$

Case 3.2: $T_3^{eng}$<$T_{max}^{engine}$ ($N_3$), $N_3$<$N_{max}$—New operating point is inside the envelope after double downshift. Command double downshift (from fourth gear to second gear—gear ratio to $g_2$), and command the fuel from the fueling schedule map.

Case 3.3: $T_3^{eng}$<$T_{max}^{engine}$ ($N_3$), $N_3$<$N_{max}$—New operating point is outside the envelope. Usually one does not wish to do triple downshifting. Therefore, command the double downshift, command the engine to $T_3^{eng}$= $T_{max}^{engine}$ ($N_2$), and bring up the electric motor to make up the difference:

$$T_1^{em} = \frac{P_1 - N_2 * T_2^{eng}}{N_2} * \frac{g_3}{g_{fd}}$$

The upshifting schedule may be "optimized" for best fuel economy/drivability except that an upshifting that takes the operating point beyond the maximum torque envelope must be prohibited. Fortunately, this condition is easy to detect.

Figure 6A:
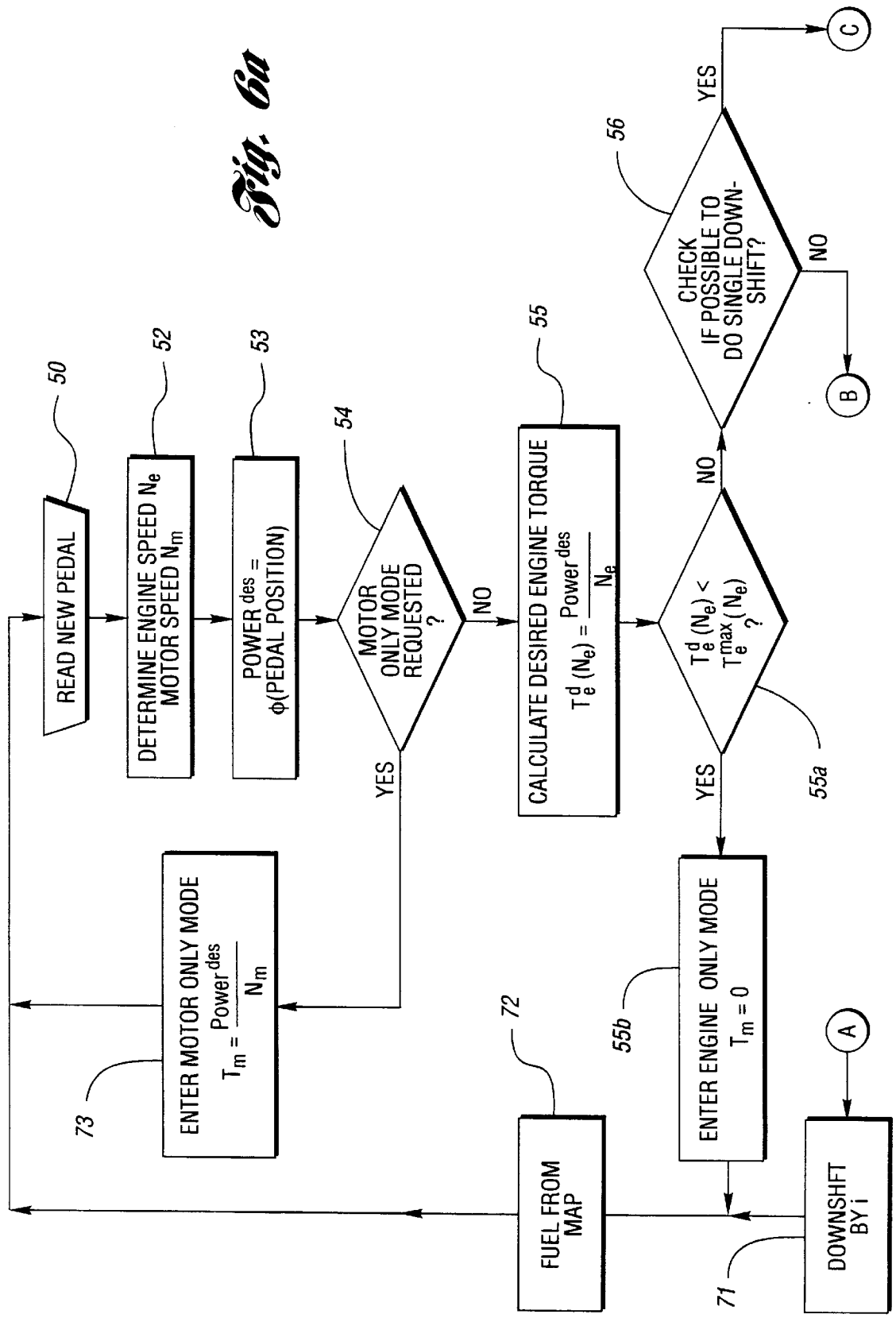
FIGS. 6a and 6b show a flow chart that illustrates the control strategy for the hybrid vehicle powertrain.
Figure 6B:
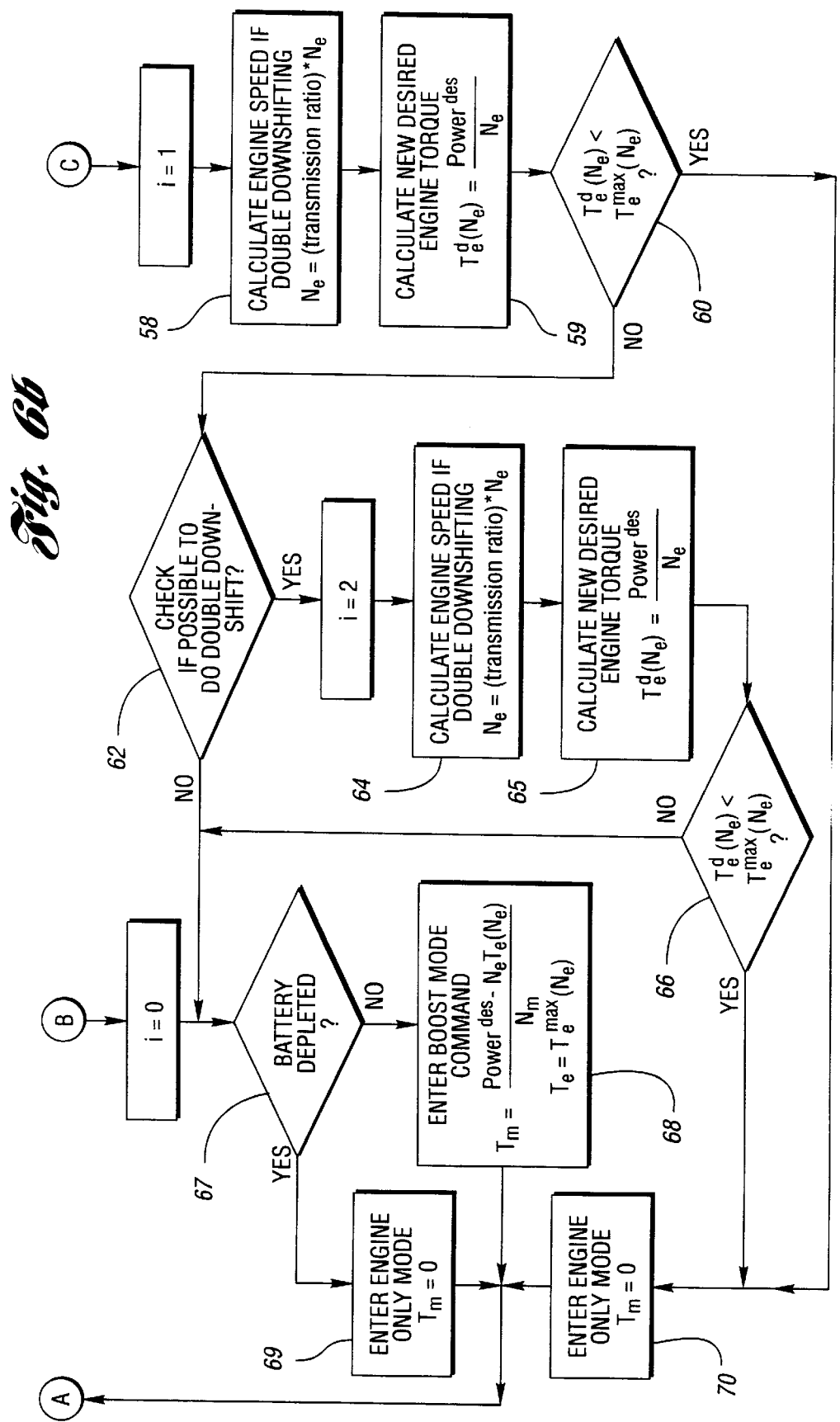

FIGS. 6a and 6b show a flow chart showing the steps involved in the control strategy. The driver experiences a change in power in terms of the engine torque and power delivered between shifting.

In the flow chart of FIGS. 6a and 6b, the vehicle system controller 24 will read during each control loop a new pedal position (block 50). Engine speed $N_e$ will be determined (from the sensed signal), as well as motor speed $N_m$ (block 52). The next step is to calculate the desired power at the wheels. This can be done based on the functional relationship between the pedal position and power, or based on the pedal to power map. This relationship/map is calibratable, the only restriction being that for fixed pedal position input, a fixed power level output results (block 53).

In the next step (block 54), a check is made to determine if it is desirable to enter motor only mode. This decision depends on the adopted energy management strategy.

If the strategy calls for motor only mode, the controller sends a torque command (block 73) to the electric motor.

In the case in which the strategy does not call for motor only mode operation (negative branch from block 54), the vehicle could enter any of the two following modes of hybrid operation: (i) engine only mode, or (ii) boost mode where electric motor provides additional power to the driveshaft to meet driver demands. The algorithm calculates the desired torque required from the engine (block 55).

This torque is then compared (in block 55*a*) with the maximum torque that the engine is capable of supplying at this engine speed ($T_e^{max}(N_e)$).

If the torque desired from the engine at this engine speed is less than the max engine torque (desired engine torque is within the envelope of maximum engine torque), the engine only mode is entered (block 55*b*); zero motor torque is requested, and the fuel quantity is decided from the diesel fueling map (FIG. 4).

If the engine is not capable of delivering the requested torque (i.e. the maximum torque available from the engine ($T_e^{max}(N_e)$ is less than the desired torque), the driver's demand for increased power can be met: by commanding downshifts, if possible (to get in the area of higher engine speed-higher available power), or by commanding the boost from the electric motor (to make up the difference between the available and the desired torque).

In block 56, a check is made to determine whether it is possible to do a single downshift. A downshift will not be possible if the transmission is already in first gear, or even if in second and for the drivability reasons it is not desirable to shift to the first gear. In addition, if the speed after the downshift is higher than the maximum engine speed for the engine, the downshift will not be commanded. The multiple counter for the downshifting will be set to zero (i=0—as in no downshifts possible).

The battery has to be checked next (block 67) to prevent commanding the boost if the battery is depleted.

If the battery is depleted, the routine enters the engine only mode and commands zero torque from the electric motor (block 69).

If the battery is not depleted, the boost mode is entered and a request is made for maximum torque available from the engine and additional torque from the electric motor (block 68).

In either case, no downshift is commanded (counter i is zero in block 71), and the fuel rate then is commanded from the fuel map of FIG. 4 (block 72).

If it is possible to command a downshift (affirmative in block 56) the multiple downshift counter is set to 1 (i=1, as in single downshift possible). Engine speed after a single downshift is calculated (block 58) and desired engine torque at the new engine speed is calculated (block 59). This torque is then compared with the maximum available torque at that speed (block 60).

If the engine is capable of providing the desired torque after a single downshift (affirmative branch from block 60), the "engine only" mode is entered and zero torque is requested from the motor (block 70), a single downshift commanded (value of downshift counter i will be 1 in block 71), and the engine is fueled according to map (block 72).

If the engine is not capable of providing the requested torque (negative branch from block 60) a double downshift is considered (block 62).

If the gear is not too low (in first or second there is no opportunity to downshift) or the speed after the double downshift is not higher than the maximum engine operating speed, then a multiple downshift counter is set to 2 (it is possible to do a double downshift, i=2 and a new engine speed, after a double downshift, is calculated (block 64)). A new desired torque is calculated (block 65) and that value is compared to maximum torque available from the engine at the new speed.

If the engine is capable of providing the desired torque after the double downshift, "engine only" mode is entered, zero torque rate is requested from the motor, a double downshift is commanded (block 71 with i=2), and fuel is determined from the fuel map (FIG. 4).

If the engine is not capable of providing the desired torque after double downshifting, boosting with electric motor is considered. The decision is made based on the state of the battery (blocks 67, 68 and 69 as explained earlier). Double downshifting is commanded in either case (block 71 with i=2), and fuel rate is decided upon based on the fuel map (FIG. 4).

Although a particular control strategy is disclosed, it will be apparent to persons skilled in the art that modifications may be made without departing from the scope of the invention. All such modifications as well as equivalents thereof are to be included within the scope of the following claims.

What is claimed is:

1. A hybrid powertrain for an automotive vehicle comprising a diesel engine, a multiple ratio transmission and an electric motor, said transmission having a torque input side connected to said diesel engine and a torque output side connection to said electric motor;

said diesel engine having an accelerator pedal and a fuel scheduling means for regulating fuel delivery in response to accelerator pedal movement:

an electronic controller including memory registers, said memory registers having stored therein a first functional relationship of power desired and accelerator pedal movement, a second functional relationship between diesel engine speed and rate of fuel delivery by said fuel scheduling means for each of a family of accelerator positions and a third functional relationship between electric motor speed and electric motor current:

said controller including output driver circuit means connected to said diesel engine fuel scheduling means and said electric motor and being responsive to said accelerator pedal movement and feedback speed information from said diesel engine, said fuel scheduling means and said electric motor to effect an overall diesel engine power and diesel engine speed relationship for each accelerator pedal position that is characterized by best specific fuel consumption: and final drive gearing having torque output shafts connected to vehicle traction wheels and two final drive input shafts, one final drive torque input shaft being connected to torque output portions of said transmission and the other final drive torque input shaft being connected to said electric motor.

2. The hybrid powertrain as set forth in claim 1 wherein said diesel engine is characterized by engine torque and engine speed relationships with a maximum engine torque envelope for each engine speed value within a given operating engine speed range;

said electric controller including means for detecting whether total torque desired for a given diesel engine speed is within said envelope whereby a demand for torque in excess of the diesel engine torque for a given diesel engine speed is established by adding electric motor torque at that speed to maximum diesel engine torque available thus effecting a splitting of the total torque developed.

3. A hybrid powertrain for an automotive vehicle comprising a diesel engine, a multiple ratio transmission and an electric motor, said transmission having a torque input side connected to said diesel engine and a torque output side connection to said electric motor;

said diesel engine having an accelerator pedal and a fuel scheduling means for regulating fuel delivery in response to accelerator pedal movement;

an electronic controller including memory registers, said memory registers having stored therein a first functional relationship of power desired and accelerator pedal movement, a second functional relationship between diesel engine speed and rate of fuel delivery by said fuel scheduling means for each of a family of accelerator positions;

said controller including output driver circuit means connected to said diesel engine fuel scheduling means and said electric motor and being responsive to said accelerator pedal movement and feedback speed information from said diesel engine, said fuel scheduling means and said electric motor to effect an overall diesel engine power and diesel engine speed relationship for each accelerator pedal position that is characterized by best specific fuel consumption;

said transmission including a ratio changing control system that responds to accelerator pedal movement, said control system responding to a request for total torque that exceeds the sum of the diesel engine torque and the electric motor torque available at a given diesel engine speed by downshifting said transmission from an existing gear ratio to a lower gear ratio thereby maintaining the operation of said diesel engine in a low-speed/high-torque region; and final drive gearing having torque output shafts connected to vehicle traction wheels and two final drive input shafts, one final drive torque input shaft being connected to torque output portions of said transmission and the other final drive torque input shaft being connected to said electric motor.

* * * * *